US00RE48262E

(19) United States
(12) Reissued Patent
Wu

(10) Patent Number: US RE48,262 E
(45) **Date of Reissued Patent: *Oct. 13, 2020**

(54) COMMUNICATION SYSTEM, MOBILITY MANAGEMENT NETWORK ELEMENT AND METHOD FOR PROCESSING RESOURCE

(71) Applicant: Huawei Technologies Co., Ltd., Shenzhen (CN)

(72) Inventor: Wenfu Wu, Shanghai (CN)

(73) Assignee: Huawei Technologies Co., Ltd., Shenzhen (CN)

( * ) Notice: This patent is subject to a terminal disclaimer.

(21) Appl. No.: 15/620,355

(22) Filed: Jun. 12, 2017

Related U.S. Patent Documents

Reissue of:
(64) Patent No.: 7,801,083
Issued: Sep. 21, 2010
Appl. No.: 12/430,409
Filed: Apr. 27, 2009

U.S. Applications:
(63) Continuation of application No. 14/464,493, filed on Aug. 20, 2014, now Pat. No. Re. 46,440, which is a
(Continued)

(30) Foreign Application Priority Data

Apr. 30, 2008 (CN) ..... 2008 1 0067044
Dec. 17, 2008 (CN) ..... 2008 1 0188447
Mar. 13, 2009 (WO) ..... PCT/CN2009/070787

(51) Int. Cl.
*H04W 4/00* (2018.01)
*H04W 76/34* (2018.01)
(Continued)

(52) U.S. Cl.
CPC ..... *H04W 76/34* (2018.02); *H04W 36/0033* (2013.01); *H04W 36/14* (2013.01); *H04W 92/02* (2013.01)

(58) Field of Classification Search
CPC . H04W 36/14; H04W 36/0033; H04W 76/34; H04W 92/02
(Continued)

(56) References Cited

U.S. PATENT DOCUMENTS 7,359,347 B2 4/2008 Ahmavaara et al.
8,577,370 B1 11/2013 Mann et al.
(Continued)

FOREIGN PATENT DOCUMENTS

CN 1436435 A 8/2003
CN 1545236 A 11/2004
(Continued)

OTHER PUBLICATIONS

ETSI TS 125 413, version 6.0.0, 3rd Generation Partnership Project; Technical Specification, Universal Mobile Telecommunications System (UMTS); UTRAN Iu interface Radio Access Network Application Part (RANAP) signalling (3GPP TS 25.413 version 6.0.0 Release 6), Dec. 2003, 254 pages.
(Continued)

*Primary Examiner* — William H. Wood
(74) *Attorney, Agent, or Firm* — Gregg L. Jansen

(57) ABSTRACT

A method for processing resource, a communication system, and a mobility management network element are provided. The method includes: receiving, by a mobility management network element in a packet switched (PS) network, a Release Request message sent by an access network of the PS network or a Handoff Complete message sent by a circuit switched (CS) network when a user equipment (UE) is handed over from the PS network to the CS network; and processing, by the mobility management network element of the PS network, resources of the UE in the PS network. Thus, the processing of resources of the UE in the PS network is achieved when the UE is handed over from the
(Continued)

PS network to the CS network. A communication system and a mobility management network element are also provided.

6 Claims, 8 Drawing Sheets

Related U.S. Application Data continuation of application No. 13/623,879, filed on Sep. 21, 2012, now Pat. No. Re. 45,133, which is an application for the reissue of Pat. No. 7,801,083.

(51) Int. Cl.
*H04W 92/02* (2009.01)
*H04W 36/00* (2009.01)
*H04W 36/14* (2009.01)

(58) Field of Classification Search
USPC ..... 370/328, 329, 330, 331, 332, 333, 334; 709/227, 228, 229; 455/435, 435.1, 436, 455/437, 438, 439
See application file for complete search history.

(56) References Cited

U.S. PATENT DOCUMENTS

| | | | | |
|---|---|---|---|---|
| 8,755,270 | B2 | 6/2014 | Corbett et al. | |
| 8,942,660 | B2 * | 1/2015 | Edge | H04W 36/0022 455/404.1 |
| 2003/0157935 | A1 | 8/2003 | Kauhanen | |
| 2003/0169725 | A1 | 9/2003 | Ahmavaara et al. | |
| 2003/0171129 | A1 | 9/2003 | Sagne | |
| 2005/0021586 | A1 | 1/2005 | Bichot et al. | |
| 2005/0107087 | A1 * | 5/2005 | Makinen | H04L 41/5022 455/450 |
| 2006/0002377 | A1 | 1/2006 | Skog et al. | |
| 2006/0109819 | A1 | 5/2006 | Marin et al. | |
| 2006/0252421 | A1 | 11/2006 | Lee | |
| 2006/0258358 | A1 | 11/2006 | Kallio | |
| 2007/0010252 | A1 | 1/2007 | Balachandran et al. | |
| 2007/0213059 | A1 * | 9/2007 | Shaheen | 455/436 |
| 2008/0020775 | A1 | 1/2008 | Willars | |
| 2008/0043623 | A1 | 2/2008 | Franceschini et al. | |
| 2008/0132269 | A1 | 6/2008 | Shen et al. | |
| 2008/0186862 | A1 | 8/2008 | Corbett et al. | |
| 2008/0267128 | A1 | 10/2008 | Bennett et al. | |
| 2008/0267143 | A1 | 10/2008 | Pasanen et al. | |
| 2008/0293428 | A1 | 11/2008 | Rey et al. | |
| 2008/0320149 | A1 | 12/2008 | Faccin | |
| 2009/0239526 | A1 * | 9/2009 | Zhao et al. | 455/424 |
| 2010/0118781 | A1 | 5/2010 | Petrovic et al. | |
| 2010/0290433 | A1 | 11/2010 | Stojanovski et al. | |
| 2011/0207462 | A1 * | 8/2011 | Hallenstal | H04W 36/24 455/436 |

FOREIGN PATENT DOCUMENTS

| | | | |
|---|---|---|---|
| CN | 1921701 | A | 2/2007 |
| CN | 101022653 | A | 8/2007 |
| CN | 101047979 | A | 10/2007 |
| CN | 101048001 | A | 10/2007 |
| JP | 2003501974 | A | 1/2003 |
| JP | 2007312393 | A | 11/2007 |
| KR | 20040051328 | A | 6/2004 |
| KR | 20070067234 | A | 6/2007 |
| WO | 2006112561 | A1 | 10/2006 |
| WO | 2007007150 | A1 | 1/2007 |
| WO | 2007015066 | A2 | 2/2007 |
| WO | 2007144762 | A2 | 12/2007 |

OTHER PUBLICATIONS

3GPP TS 23.060 V8.0.0; 3rd Generation Partnership Project; Technical Specification Group Services and System Aspects; General Packet Radio Service (GPRS); Service description; Stage 2 (Release 8); Mar. 2008, 218 pages.

3GPP TS 23.216, V1.1.0, 3rd Generation Partnership Project; Technical Specification Group Services and System Aspects; Single Radio Voice Call Continuity (SRVCC); Stage 2 (Release 8), Technical Specification, Apr. 2008, 26 pages.

3GPP TS 23.272, V1.1.0, 3rd Generation Partnership Project; Technical Specification Group Services and System Aspects; Circuit Switched Fallback in Evolved Packet System; Stage 2 (Release 8), Technical Specification, Apr. 2008, 25 pages.

3GPP TS 25.331 V8.2.0, 3rd Generation Partnership Project; Technical Specification Group Radio Access Network; Radio Resource Control; (RRC); Protocol Specification (Release 8), Mar. 2008, total 4 pages.

Fodor, G., et al., "Architecture and Protocol Support for Radio Resource Management (RRM)," Dec. 19, 2007, 51 pages.

Huawei: "Discussion about PS handover for CS fallback", dated Apr. 2008, total 5 pages.

Nokia Corporation/Nokia Siemens Networks: "Hybrid PS/CS handover between E-UTRAN and GERAN Utilizing GS Interface", 3GPP TSG GERAN#35, dated Aug. 2007, total 10 pages.

* cited by examiner

COMMUNICATION SYSTEM, MOBILITY MANAGEMENT NETWORK ELEMENT AND METHOD FOR PROCESSING RESOURCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application claims priority to Chinese Patent Application No. 200810067044.0, filed Apr. 30, 2008, Chinese Patent Application No. 200810188447.0, filed on Dec. 17, 2008, and International Patent Application No. PCT/CN2009/070787, filed on Mar. 13, 2009, all of which are hereby incorporated by reference in their entirety.] *This application is a reissue continuation of U.S. patent application Ser. No. 14/464,493, filed on Aug. 20, 2014, now U.S. Pat. No. RE 46,440 which is a reissue continuation of U.S. patent application Ser. No. 13/623,879, filed on Sep. 21, 2012, now U.S. Pat. No. RE 45,133, which is a reissue application of U.S. patent application Ser. No. 12/430,409, filed on Apr. 27, 2009, now U.S. Pat. No. 7,801,803. The U.S. patent application Ser. No. 12/430,409 claims priority to an International Application No. PCT/CN2009/070787, filed on Mar. 13, 2009, and Chinese Patent Application No. 200810067044.0, filed on Apr. 30, 2008 and a Chinese Patent Application No. 200810188447.0, filed on Dec. 17, 2008. The afore-mentioned patent applications are hereby incorporated by reference in their entireties.*

TECHNICAL FIELD

The present invention relates to the field of communication technology, and more particularly to a method for processing resources, a communication system, and a mobility management network element.

BACKGROUND

FIG. 1 shows a conventional interworking architecture of a 3$^{rd}$ Generation Partnership Project (3GPP) packet switched (PS) network and a CDMA2000 1x network in a code division multiple access (CDMA) network. Referring to FIG. 1, the architecture includes: an evolved UMTS terrestrial radio access network (E-UTRAN), which is adapted to implement all radio-related functions of the evolved network; a mobility management entity (MME), which is responsible for the mobility management of the control plane, including user context management and mobility state management as well as assignment of temporary user IDs; a serving gateway (SGW), which is a user plane anchor point between 3GPP access networks, and adapted to terminate an interface of the E-UTRAN; and a packet data network gateway (PGW), which is a user plane anchor point between a 3GPP access network and a non-3GPP access network, and adapted to terminate an interface with an external packet data network (PDN).

A UMTS terrestrial radio access network (UTRAN) and a GSM/EDGE radio access network (GERAN) are adapted to implement all radio-related functions in an existing GPRS/UMTS network. A serving GPRS supporting node (SGSN) is adapted to implement routing and forwarding, mobility management, session management, user information storage, and other functions in the GPRS/UMTS network.

A 1x circuit switched (CS) domain access network is adapted to implement radio-related functions in the CDMA2000 1x network. A 1x CS mobile switching center (MSC) is mainly adapted to provide mobility management and switching functions for mobile users, and realize the interworking between mobile users as well as between mobile users and fixed users. An interworking solution function (IWS) is adapted to implement a function of exchanging and forwarding 1x CS signaling, so as to encapsulate 1x CS signaling from the 1x CS MSC and send the encapsulated 1x CS signaling to a user equipment (UE) through the 3GPP PS network; or the UE sends encapsulated 1x CS signaling to the IWS through the 3GPP PS network, and the IWS forwards the encapsulated 1x CS signaling to the 1x CS MSC. The IWS is also described as a 1x CS IWS.

In order to ensure the interworking between the 3GPP PS network and the original CS network, a technology for handing over a voice over IP (VoIP) service in the 3GPP PS network to the CDMA2000 1x network has been proposed in the prior art. FIG. 2 is a signaling flow chart of a procedure for handing over a VoIP service of a UE from a 3GPP PS network to a CDMA2000 1x network in the prior art. Referring to FIG. 2, the procedure is as follows.

(1) A VoIP session exists in the 3GPP PS network.

(2) An access network of the 3GPP PS network decides to hand over to the CDMA2000 1x. The access network of the 3GPP PS network may be an E-UTRAN, a GERAN, or a UTRAN.

(3) The access network of the 3GPP PS network sends a relocation indication to notify the UE to perform an inter-system handover.

(4) The UE sends a 1x Origination message to a 1x CS IWS through the 3GPP PS network. That is, the UE sends the 1x Origination message to the access network of the 3GPP PS network, and the access network of the 3GPP PS network encapsulates the 1x Origination message into an Uplink CDMA2000 Tunnel message and sends the Uplink CDMA2000 Tunnel message to a mobility management network element of the 3GPP PS network. For the GERAN/UTRAN network, the mobility management network element of the 3GPP PS network is an SGSN; and for the E-UTRAN, the mobility management network element of the 3GPP PS network is an MME. After receiving the Uplink CDMA2000 Tunnel message, the mobility management network element of the 3GPP PS network acquires the 1x Origination message from the Uplink CDMA2000 Tunnel message, and sends the 1x Origination message to the 1x CS IWS.

(5) The IWS sends a CM Service Request message to a 1x CS MSC.

(6) The MSC sends an Assignment Request message to the IWS.

(7) The IWS sends a Handoff Direction message to the UE through the 3GPP PS network. That is, the IWS sends the Handoff Direction message to the mobility management network element of the 3GPP PS network; the mobility management network element of the 3GPP PS network sends a Downlink CDMA2000 Tunnel message (the Handoff Direction message is encapsulated in the message) to the access network of the 3GPP PS network; and the access network of the 3GPP PS network forwards the Handoff Direction message to the UE.

(8) The UE is handed over to the CDMA 1x network, and a traffic channel acquisition (TCC) procedure is performed to obtain a traffic channel.

(9) The UE sends a 1x Handoff Complete message to the CDMA2000 1x access network.

(10) The CDMA2000 1x access network sends a Handoff Complete message or an Assignment Complete message to the MSC.

(11) A voice call is established in the CDMA2000 1x network.

It is known from the above procedure that, in the current mechanism for the handover from the 3GPP PS network to the CDMA2000 1x network, when the UE is handed over from the 3GPP PS network to the CDMA2000 1x network, no mechanism is provided for processing resources in the PS network related to the UE. In addition, the same problem also occurs when the UE is handed over from the PS network to other CS networks similar to the CDMA2000 1x network.

SUMMARY

Accordingly, an embodiment of the present invention provides a method for processing resource so as to process resources of a UE in a PS network when the UE is handed over from the PS network to a CS network. The method is as follows.

A mobility management network element in a PS network receives a Release Request message sent by an access network of the PS network or a Handoff Complete message sent by a CS network when a UE is handed over from the PS network to the CS network, and then processes resources of the UE in the PS network.

Through the method for processing resource provided by the embodiments of the present invention, the mobility management network element of the PS network initiates processing of the resources of the UE in the PS network upon receiving the Release Request message sent by the access network of the PS network or the Handoff Complete message sent by the CS network, so that the processing of the resources of the UE in the PS network is achieved when the UE is handed over from the PS network to the CS network.

An embodiment of the present invention further provides a communication system so as to process resources of a UE in a PS network when the UE is handed over from the PS network to a CS network.

The communication system includes a mobility management network element of a PS network and an access network of the PS network, wherein when a UE is handed over from the PS network to a CS network, the access network of the PS network is adapted to send a Release Request message to the mobility management network element of the PS network, and the mobility management network element of the PS network is adapted to receive the Release Request message sent by the access network of the PS network and process resources of the UE in the PS network.

Through the communication system provided by the embodiments of the present invention, the access network of the PS network sends a Release Request message to the mobility management network element of the PS network, and the mobility management network element of the PS network initiates processing of the resources of the UE in the PS network upon receiving the Release Request message sent by the access network of the PS network, so that the processing of the resources of the UE in the PS network is achieved when the UE is handed over from the PS network to the CS network.

An embodiment of the present invention further provides another communication system so as to process resources of a UE in a PS network when the UE is handed over from the PS network to a CS network.

The communication system includes a mobility management network element of a PS network and a CS network. When a UE is handed over from the PS network to the CS network, the CS network is adapted to send a Handoff Complete message to the mobility management network element of the PS network; and the mobility management network element of the PS network is adapted to receive the Handoff Complete message sent by the CS network and process resources of the UE in the PS network after receiving the Handoff Complete message.

Through the communication system provided by the embodiment of the present invention, the CS network sends a Handoff Complete message to the mobility management network element of the PS network, and the mobility management network element of the PS network initiates processing of the resources of the UE in the PS network upon receiving the Handoff Complete message sent by the CS network, so that the processing of the resources of the UE in the PS network is achieved when the UE is handed over from the PS network to the CS network.

An embodiment of the present invention further provides a mobility management network element in a PS network so as to process resources of a UE in a PS network when the UE is handed over from the PS network to a CS network.

The mobility management network element includes a receiving unit and a resource processing unit. The receiving unit is adapted to receive a Release Request message sent by an access network of the PS network or a Handoff Complete message sent by a CS network when a UE is handed over from the PS network to the CS network. The resource processing unit is adapted to process resources of the UE in the PS network after the receiving unit receives the Release Request message sent by the access network of the PS network or the Handoff Complete message sent by the CS network.

Through the mobility management network element provided by the embodiment of the present invention, the receiving unit receives a Release Request message sent by the access network of the PS network or a Handoff Complete message sent by the CS network when the UE is handed over from the PS network to the CS network, and the resource processing unit initiates processing of the resources of the UE in the PS network after the receiving unit receives the Release Request message sent by the access network of the PS network or the Handoff Complete message sent by the CS network, so that the processing of the resources of the UE in the PS network is achieved when the UE is handed over from the PS network to the CS network.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In embodiments of the present invention, for the GERAN/UTRAN network, the mobility management network element of the PS network may be an SGSN; and for the E-UTRAN, the mobility management network element of the PS network is an MME.

In the embodiments of the present invention, the CS network to which the UE is handed over from the PS network may be a CDMA2000 1x network, a GSM network, or other CS networks.

Figure 1:
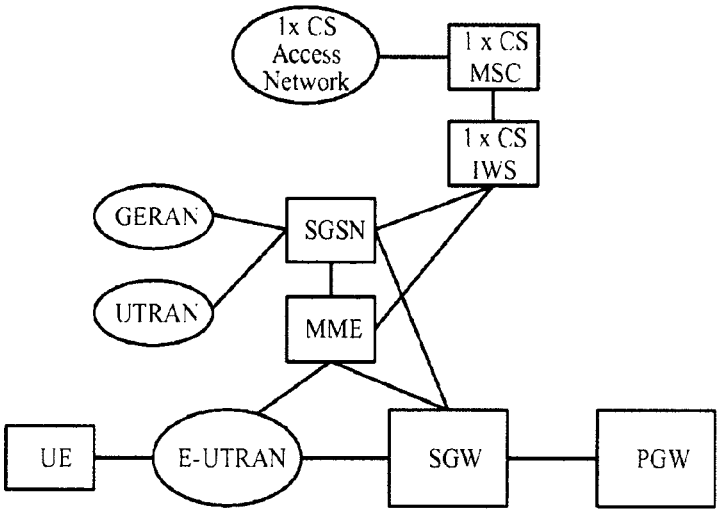
FIG. 1 shows interworking architecture of a 3GPP PS network and a CDMA2000 1x network in a CDMA network.
Figure 2:
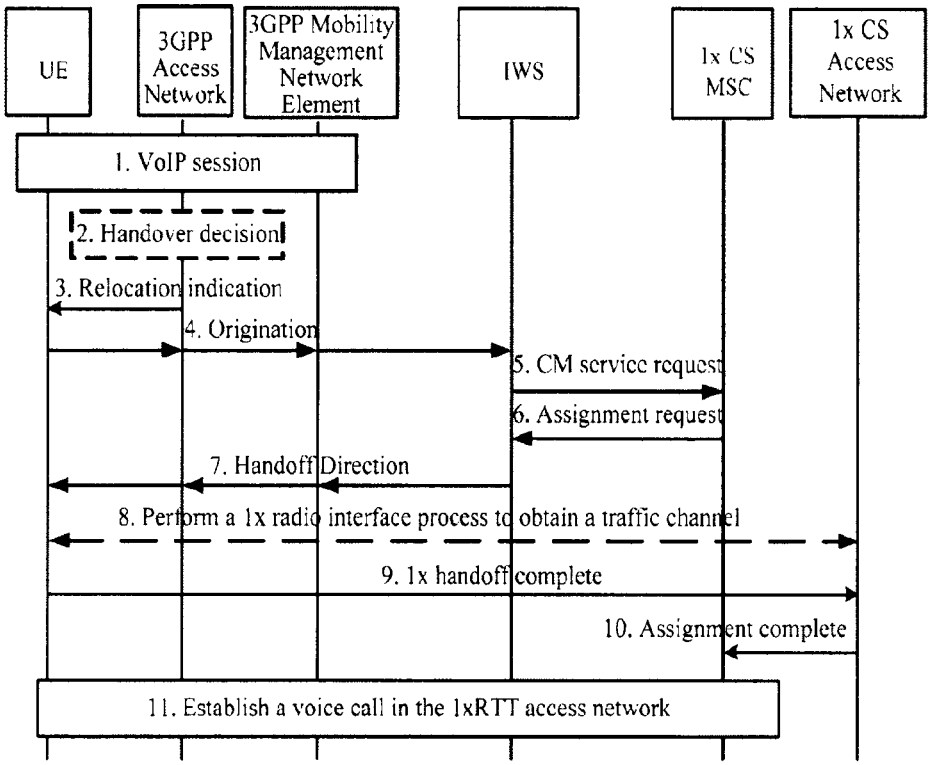
FIG. 2 is a signaling flow chart of a procedure for handing over a VoIP service of a UE from a 3GPP PS network to a CDMA2000 1x network.
Figure 3:
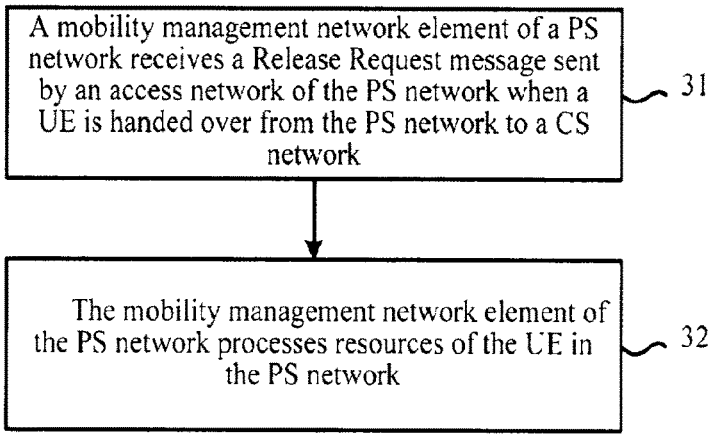
FIG. 3 is a flow chart of a method for processing resource according to an embodiment of the present invention.

FIG. 3 is a flow chart of a method for processing resource according to an embodiment of the present invention. Referring to FIG. 3, the method is as follows.

In Step 31, when a UE is handed over from a PS network to a CS network, a mobility management network element of the PS network receives a Release Request message sent by an access network of the PS network.

In Step 32, the mobility management network element of the PS network processes resources of the UE in the PS network.

Figure 4:
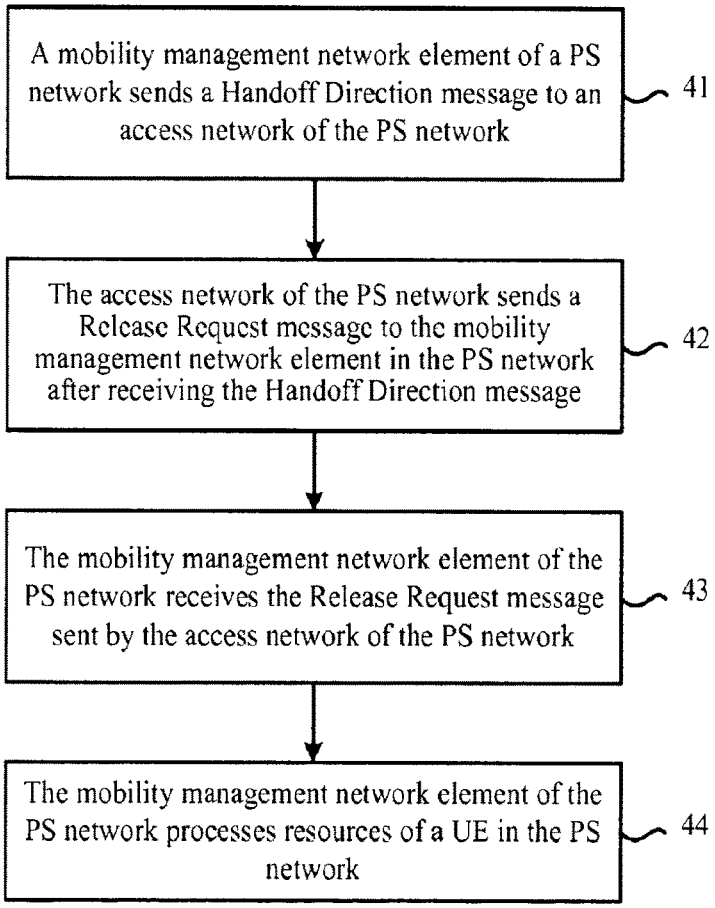
FIG. 4 is a flow chart of another method for processing resource according to another embodiment of the present invention.

FIG. 4 is a flow chart of a method for processing resource according to another embodiment of the present invention. Referring to FIG. 4, the method is as follows:

In Step 41, a mobility management network element in a PS network sends a Handoff Direction message to an access network of the PS network.

In Step 42, the access network of the PS network sends a Release Request message to the mobility management network element of the PS network after receiving the Handoff Direction message.

In Step 43, the mobility management network element of the PS network receives the Release Request message sent by the access network of the PS network.

In Step 44, the mobility management network element of the PS network processes resources of a UE in the PS network.

In this embodiment, the access network of the PS network determines that the UE is handed over according to the received Handoff Direction message sent by the mobility management network element of the PS network, and then actively initiates a Release Request message, so that the mobility management network element of the PS network processes the resources of the UE in the PS network.

Figure 5:
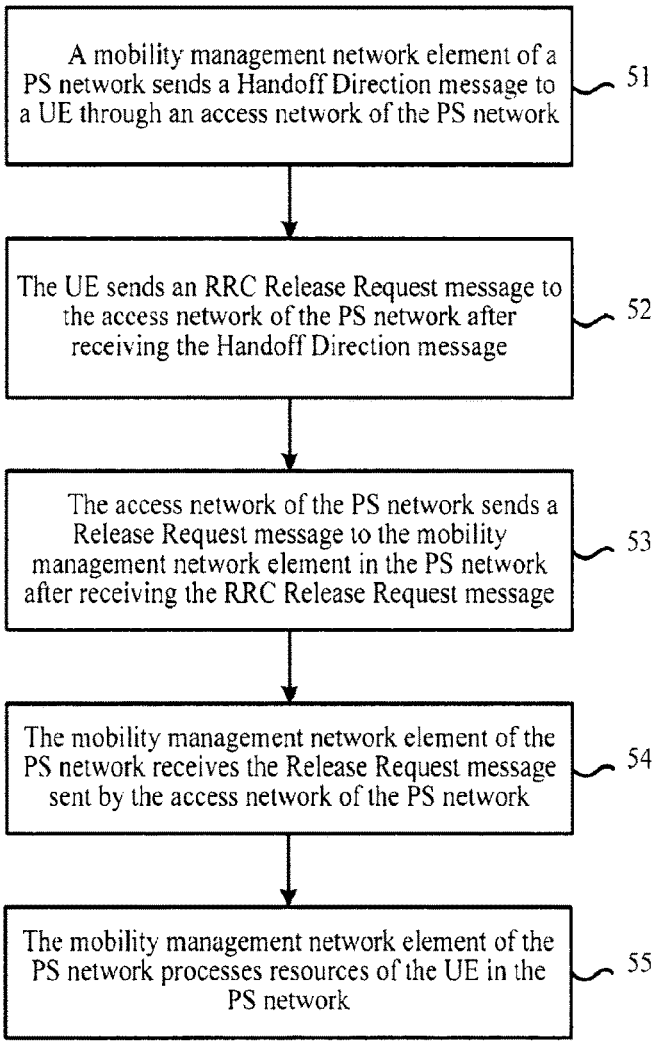
FIG. 5 is a flow chart of another method for processing resource according to still another embodiment of the present invention.

FIG. 5 is a flow chart of a method for processing resource according to still another embodiment of the present invention. Referring to FIG. 5, the method is as follows.

In Step 51, a mobility management network element in a PS network sends a Handoff Direction message to a UE through an access network of the PS network.

In Step 52, the UE sends a Radio Resource Control (RRC) Release Request message to the access network of the PS network after receiving the Handoff Direction message. The RRC Release Request message may be adapted to indicate the access network of the PS network to release an RRC connection. The RRC Release Request message sent by the UE may also contain indication information indicating that the RRC Release Request is caused by handing over the UE to a CS network. For example, the UE carries a "Cause" information element (IE) in the message, and a value of the IE is set to "Handover Triggered"; or the UE carries a "Handover Triggered Indicator" IE in the message.

In Step 53, the access network of the PS network sends a Release Request message to the mobility management network element of the PS network after receiving the RRC Release Request message.

In Step 54, the mobility management network element of the PS network receives the Release Request message sent by the access network of the PS network.

In Step 55, the mobility management network element of the PS network processes resources of the UE in the PS network.

In this embodiment, upon receiving the Handoff Direction message sent by the network side, i.e., when the UE has finished the CS network access establishment through the PS network and is ready to be handed over to the CS network, the UE actively initiates a release procedure, and sends an RRC Release Request message to the access network of the PS network to indicate the network side that the resources of the UE in the PS network can be processed; the access network of the PS network sends the Release Request message to the mobility management network element of the PS network after receiving the RRC Release Request message sent by the UE, so that the mobility management network element of the PS network processes the resources of the UE in the PS network.

In the Steps 31, 42, and 53 of the above embodiments, the Release Request message sent by the access network of the PS network to the mobility management network element of the PS network may contain indication information to indicate that the Release Request is caused by handing over the UE to the CS network, which is adapted to indicate that this Release Request is caused by handing over the UE to the CS network. For example, the access network of the PS network may carry a "Cause" IE in the Release Request message, and a value of the IE is set to "Handover Triggered"; or the access network of the PS network may carry a "Handover Triggered Indicator" IE in the Release Request message.

After receiving the Release Request message sent by the access network of the PS network, if the mobility management network element of the PS network finds that the message carries the indication information indicating that the Release Request is caused by handing over the UE to the CS network, the mobility management network element of the PS network processes the resources of the UE in the PS network.

Figure 6:
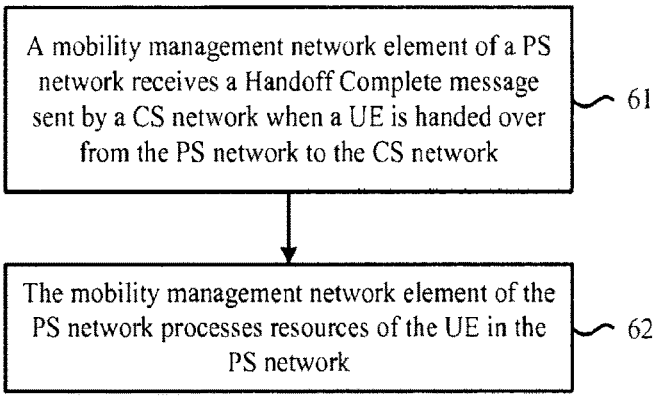
FIG. 6 is a flow chart of another method for processing resource according to still another embodiment of the present invention.

FIG. 6 is a flow chart of a method for processing resource according to still another embodiment of the present invention. Referring to FIG. 6, the method is as follows.

In Step 61, when a UE is handed over from a PS network to a CS network, a mobility management network element of the PS network receives a Handoff Complete message sent by the CS network.

In Step 62, the mobility management network element of the PS network processes resources of the UE in the PS network.

In Step 61, the process in which the mobility management network element of the PS network receives the Handoff Complete message sent by the CS network may be as follows according to a specific configuration of network equipments.

If an IWS between the CS network and the PS network is integrated with an access network element of the CS network, the access network element of the CS network sends the Handoff Complete message to the mobility management network element of the PS network after receiving the Handoff Complete message sent by the UE.

Alternatively, if the IWS between the CS network and the PS network is integrated with the mobility management network element of the PS network, a mobility management network element of the CS network sends a Clear Command message to the mobility management network element of the PS network after receiving the Handoff Complete message sent by the access network element of the CS network. In this case, after the mobility management network element of the PS network receives the Clear Command message, the IWS in the mobility management network element of the PS network may convert the Clear Command message into a Handoff Complete message; or after receiving the Clear Command message, the mobility management network element of the PS network may consider that the Handoff Complete message is received and perform subsequent processing.

Alternatively, if the IWS between the CS network and the PS network is an independent network element, the mobility management network element of the CS network sends a Clear Command message to the IWS after receiving the Handoff Complete message sent by the access network element of the CS network, and the IWS sends the Handoff Complete message to the mobility management network element of the PS network.

Alternatively, if the IWS between the CS network and the PS network is integrated with the mobility management network element of the CS network, the mobility management network element of the PS network receives the Handoff Complete message sent by the mobility management network element of the CS network.

For a CDMA2000 1x network, the mobility management network element of the CS network may be a 1x CS MSC.

In this embodiment, when the UE is handed over from the PS network to the CS network, the mobility management network element of the PS network determines that the UE is successfully handed over to the CS network according to the received Handoff Complete message sent by the CS network, and actively initiates processing of the resources of the UE in the PS network.

In Steps 32, 44, 55, and 62 of the above embodiments, the mobility management network element of the PS network may process the resources of the UE in the PS network in one of the following manners.

The mobility management network element of the PS network initiates an implicit user detachment procedure (i.e., the network side does not need to send a Detach message to notify the UE to detach after the UE is detached from the network side) to detach the UE from the PS network.

Alternatively, the mobility management network element of the PS network does not initiate the detachment of the UE, but reserves all bearers of the UE in the PS network, and indicates an SGW to suspend the bearers.

Alternatively, the mobility management network element of the PS network does not initiate the detachment of the UE, but initiates delete bearer procedure(s) to delete one part of the bearers and reserves the other part of bearers according to different bearer types, and indicates the SGW to suspend the reserved bearers. For example, for Guaranteed Bit Rate (GBR) bearers, the mobility management network element of the PS network initiates delete bearer procedure(s) to delete the GBR bearers; and for non-GBR bearers, the mobility management network element of the PS network reserves the non-GBR bearers, and indicates the SGW to suspend the non-GBR bearers. Dedicated network resources need to be allocated to the GBR bearers, but do not need to be allocated to the non-GBR bearers, as the non-GBR bearers may share network resources with the other part of bearers. In this way, as the GBR bearers are deleted in time, the dedicated network resources may be released in time. The non-GBR bearers, which may share network resources with the other part of bearers due to no waste of network resources, are suspended.

Alternatively, for VoIP bearers, the mobility management network element of the PS network initiates delete bearer procedure(s) to delete the VoIP bearers; for bearers other than the VoIP bearers, the mobility management network element of the PS network reserves the bearers other than the VoIP bearers, and indicates the SGW to suspend the bearers other than the VoIP bearers. In this way, original voice bearers of the UE in the PS network may be released in time, and other non-voice bearers may be reserved and suspended. Thus, after returning to the PS network, the UE can continuously provide services to the user.

In this embodiment to the present invention, when the mobility management network element of the PS network needs to delete one part of the bearers while reserving the other part of bearers according to different bearer types, one of the following manners may also be used.

(1) The mobility management network element of the PS network may indicate the SGW to suspend all bearers of the UE; and the mobility management network element of the PS network reserves one part of the bearers (for example, non-GBR bearers) and initiating a delete bearer procedure to delete the other part of bearers (for example, GBR bearers) according to different bearer types.

(2) The mobility management network element of the PS network deletes one part of the bearers (for example, GBR bearers) and reserves the other part of bearers (for example, non-GBR bearers) according to different bearer types, and indicates the SGW to suspend the reserved bearers; the SGW suspends the reserved bearers and deletes the unreserved bearers after receiving a Suspend Bearer message (that is, the SGW deletes the unsuspended bearers, for example, the SGW deletes the GBR bearers).

(3) The mobility management network element of the PS network deletes one part of the bearers (for example, GBR bearers) and reserves the other part of bearers (for example, non-GBR bearers) according to different bearer types, and indicates the SGW to suspend all bearers of the UE; the SGW deletes one part of the bearers (for example, GBR bearers) and suspends the reserved bearers (for example, non-GBR bearers) according to different bearer types after receiving a Suspend Bearer message. In this manner, the SGW and the mobility management network element are required to have the same bearer processing rule.

(4) The mobility management network element of the PS network deletes one part of the bearers and reserves the other part of bearers according to different bearer types, and indicates the SGW to suspend the reserved bearers and delete the unreserved bearers. The manner 4) may be implemented in one of the following four methods.

Method 1: The mobility management network element of the PS network sends an Update Bearer Request message to the SGW. The Update Bearer Request message contains IDs of bearers to be suspended and IDs of bearers to be deleted as well as states of the bearers. The states of the bearers to be suspended are set to "suspend", and the states of the bearers to be deleted are set to "delete." After receiving the Update Bearer Request message, the SGW suspends the bearers corresponding to the IDs of the bearers in the "suspend" state, and delete the bearers corresponding to the IDs of the bearers in the "delete" state.

In this method, the content carried by the Update Bearer Request message is, for example, as follows:

Bearer ID 1, Suspend
Bearer ID 2, Suspend
Bearer ID 3, Delete
Bearer ID 4, Delete.

Method 2: The mobility management network element of the PS network sends an Update Bearer Request message to the SGW. The Update Bearer Request message contains a suspend list of the IDs of the bearers to be suspended and a delete list of the IDs of the bearers to be deleted. After receiving the Update Bearer Request message, the SGW suspends the bearers corresponding to the suspend list, and deletes the bearers corresponding to the delete list.

In this method, the content carried by the Update Bearer Request message is, for example, as follows:

Suspend List:
Bearer ID 1
Bearer ID 2
Delete List:
Bearer ID 3
Bearer ID 4.

Method 3: The mobility management network element of the PS network sends a Suspend Bearer Request message to the SGW. The Suspend Bearer Request message contains a suspend list of the IDs of the bearers to be suspended and a delete list of the IDs of the bearers to be deleted. After receiving the Suspend Bearer Request message, the SGW sets states of the bearers corresponding to the suspend list to "suspend", and deletes the bearers corresponding to the delete list.

Method 4: The mobility management network element of the PS network sends a Suspend Bearer Request message to the SGW. The Suspend Bearer Request message contains an ID of the UE and a delete list of the IDs of the bearers to be deleted. After receiving the Suspend Bearer Request message, the SGW deletes bearers corresponding to the delete list, and suspends the other part of bearers.

The mobility management network element of the PS network indicates the SGW to suspend the bearers to be suspended in the following four manners:

Manner 1: The mobility management network element of the PS network sends an Update Bearer Request message to the SGW. The Update Bearer Request message contains IDs of bearers to be suspended and states of the bearers, and the states of the bearers are set to "suspend." After receiving the Update Bearer Request message, the SGW suspends the bearers corresponding to the IDs of bearers.

Manner 2: The mobility management network element of the PS network sends an Update Bearer Request message to the SGW. The Update Bearer Request message contains the ID of the UE and states of the bearers, and the states of the bearers are set to "suspend." After receiving the Update Bearer Request message, the SGW suspends all bearers of the UE.

Manner 3: The mobility management network element of the PS network sends a Suspend Bearer Request message to the SGW. The Suspend Bearer Request message contains IDs of bearers to be suspended. After receiving the Suspend Bearer Request message, the SGW sets states of the bearers corresponding to the IDs of bearers to "suspend."

Manner 4: The mobility management network element of the PS network sends a Suspend Bearer Request message to the SGW. The Suspend Bearer Request message carries the ID of the UE. After receiving the Suspend Bearer Request message, the SGW sets states of all bearers of the UE to "suspend."

After the SGW suspends the bearers, the SGW subsequently receives downlink data packets on the suspended bearers but does not trigger paging. The SGW may buffer these downlink data packets, and may also release resources used by the suspended bearers between the SGW and a downlink user plane network element, for example, release downlink TEIDs used by the suspended bearers. For example, for an E-UTRAN network, the SGW releases resources between the SGW and an eNodeB; for a UTRAN network, the SGW releases resources between the SGW and a radio network controller (RNC) or a 3G SGSN; and for a GERAN network, the SGW releases resources between the SGW and a 2G SGSN.

A procedure for handing over a UE from a PS network to a CDMA2000 1x network is taken for example in the following detailed illustration. Basic processes and processing mechanisms for other CS networks such as a GSM CS network are the same or similar, so the details will not be described herein again.

Figure 7:
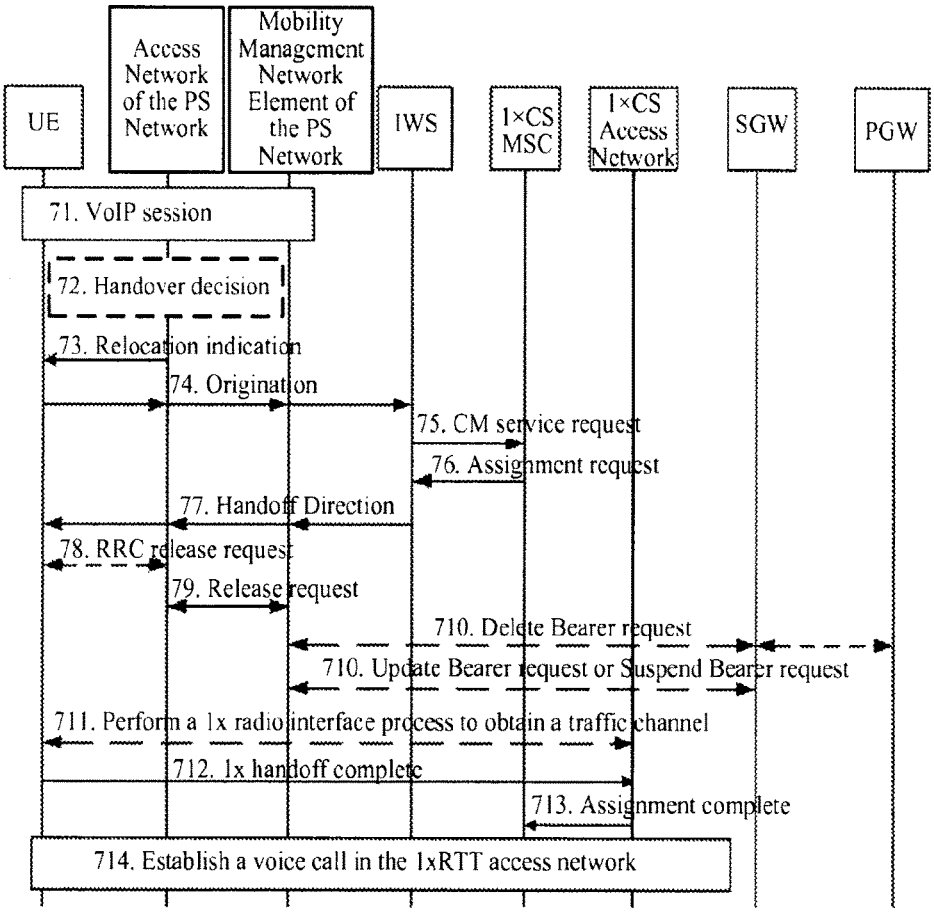
FIG. 7 is a signaling flow chart of a method for processing resource when a UE is handed over from a PS network to a CDMA2000 1x network according to an embodiment of the present invention.

FIG. 7 is a signaling flow chart of a method for processing resource when a UE is handed over from a PS network to a CDMA2000 1x network according to an embodiment of the present invention. Referring to FIG. 7, the method is specifically as follows.

In Step 71, a VoIP session exists in a PS network.

In Step 72, an access network of the PS network decides to hand over to a CDMA2000 1x network. The access network of the PS network may be an E-UTRAN, a GERAN, or a UTRAN.

In Step 73, the access network of the PS network sends a relocation indication to notify the UE to perform an inter-system handover.

In Step 74, the UE sends a 1x Origination message to a 1x CS IWS through the PS network. That is, the UE sends the 1x Origination message to the access network of the PS network, and the access network of the PS network sends an Uplink CDMA2000 Tunnel message (the 1x Origination message is encapsulated in the message) to a mobility management network element of the PS network (for the GERAN/UTRAN network, the mobility management network element of the PS network is an SGSN; and for the E-UTRAN, the mobility management network element of the PS network is an MME). After receiving the Uplink CDMA2000 Tunnel message, the mobility management network element of the PS network acquires the 1x Origination message from the Uplink CDMA2000 Tunnel message, and sends the 1x Origination message to the 1x CS IWS.

In Step 75, the IWS sends a CM Service Request message to a 1x CS MSC.

In Step 76, the MSC sends an Assignment Request message to the IWS.

In Step 77, the IWS sends a Handoff Direction message to the UE through the PS network. That is, the IWS sends the Handoff Direction message to the mobility management network element of the PS network; the mobility management network element of the PS network sends a Downlink CDMA2000 Tunnel message (the Handoff Direction message is encapsulated in the message) to the access network of the PS network; and the access network of the PS network forwards the Handoff Direction message to the UE.

In Step 78, the UE sends an RRC Release Request message to the access network of the PS network before being handed over to the CDMA 1x network. The UE carries indication information in the RRC Release Request message, and the indication information is adapted to indicate the access network of the PS network that the RRC connection release is caused by a handover. For example, the UE carries a "Cause" IE in the message, and a value of the IE is set to "Handover Triggered"; or the UE carries a "Handover Triggered Indicator" IE in the message.

In Step 79, the access network of the PS network sends a release request message to the mobility management network element of the PS network after receiving the RRC Release Request message. For the E-UTRAN network, the release request message is an S1 UE Context Release Request message, and for the UTRAN/GERAN network, the release request message is an Iu Release Request message. The access network of the PS network carries indication information in the Release Request message, and the indication information is adapted to indicate the mobility management network element of the PS network that the Release Request is caused by handing over the UE. For example, the access network of the PS network carries a "Cause" IE in the Release Request message, and a value of the IE is set to "Handover Triggered"; or the access network of the PS network carries a "Handover Triggered Indicator" IE in the Release Request message.

In Step 710, the mobility management network element of the PS network manages resources of the UE in the PS network after receiving the above message. The mobility management network element of the PS network may process the resources as follows.

(1) The mobility management network element of the PS network initiates an implicit user detachment procedure to detach the UE from the PS network. When the UE is detached from the network, bearers are deleted from the PS network. At this time, as shown in FIG. 7, the mobility management network element of the PS network only sends a Delete Bearer Request message to the SGW. The SGW interacts with a PDN GW to delete the bearers related to the UE.

(2) The mobility management network element of the PS network does not detach the UE (that is, reserves an MM context of the UE). For GBR bearers, the mobility management network element of the PS network initiates a delete bearer procedure to delete the bearers, that is, sends a Delete Bearer Request message to the SGW; and for non-GBR bearers, the mobility management network element of the PS network reserves these bearers, but indicates the SGW to suspend these bearers.

(3) The mobility management network element of the PS network does not detach the UE (that is, reserves the MM context of the UE). For VoIP bearers, the mobility management network element of the PS network initiates a delete bearer procedure to delete the bearers, that is, sends a Delete Bearer Request message to the SGW; and for the other part of bearers, the mobility management network element of the PS network reserves these bearers, but indicates the SGW to suspend these bearers.

(4) The mobility management network element of the PS network does not detach the UE (that is, reserves the MM context of the UE). For the bearers, the mobility management network element of the PS network reserves the bearers, but indicates the SGW to suspend the bearers.

The mobility management network element of the PS network may indicate the SGW to suspend the bearers in the following methods.

(a) The mobility management network element of the PS network sends an Update Bearer Request message to the SGW. For each bearer to be suspended, the Update Bearer Request message carries an ID of the bearer and a state of the bearer. The mobility management network element of the PS network sets the state of the bearer to "suspend."

(b) The mobility management network element of the PS network sends an Update Bearer Request message to the SGW. The message carries an ID of the UE and states of bearers. The mobility management network element of the PS network sets the states of the bearers to "suspend", and the SGW sets states of all bearers of the UE to "suspend."

(c) The mobility management network element of the PS network sends a Suspend Bearer Request message to the SGW. For each bearer to be suspended, the Suspend Bearer Request message carries an ID of the bearer. After receiving the Suspend Bearer Request message, the SGW sets a state of the bearer corresponding to the ID to "suspend."

(d) The mobility management network element of the PS network sends a Suspend Bearer Request message to the SGW. The message carries the ID of the UE. After receiving the Suspend Bearer Request message, the SGW sets states of all bearers of the UE to "suspend."

In Step 711, the UE is handed over to the CDMA 1x network, and a TCC procedure is performed to obtain a traffic channel.

In Step 712, the UE sends a 1x Handoff Complete message to the CDMA2000 1x access network.

In Step 713, the CDMA2000 1x access network sends a Handoff Complete message or an Assignment Complete message to the MSC.

In Step 714, a voice call is established in the CDMA2000 1x network.

In this embodiment of the present invention, when the mobility management network element of the PS network needs to delete one part of the bearers and reserve the other part of bearers according to different bearer types, one of the following manners may also be used.

(1) The mobility management network element of the PS network may indicate the SGW to suspend all bearers of the UE; and the mobility management network element of the PS network reserves one part of the bearers (for example, non-GBR bearers) and initiates a delete bearer procedure to delete the other part of bearers (for example, GBR bearers) according to different bearer types.

(2) The mobility management network element of the PS network deletes one part of the bearers (for example, GBR bearers) and reserves the other part of bearers (for example, non-GBR bearers) according to different bearer types, and indicates the SGW to suspend the reserved bearers; and the SGW suspends the reserved bearers and deletes the unreserved bearers after receiving a Suspend Bearer message (i.e., the SGW deletes the unsuspended bearers, for example, the SGW deletes the GBR bearers).

(3) The mobility management network element of the PS network deletes one part of the bearers (for example, GBR bearers) and reserves the other part of bearers (for example, non-GBR bearers) according to different bearer types, and indicates the SGW to suspend all bearers of the UE; and the SGW deletes one part of the bearers (for example, GBR bearers) and suspends the reserved bearers (for example, non-GBR bearers) according to different bearer types after receiving a Suspend Bearer message. In this manner, the SGW and the mobility management network element are required to have the same bearer processing rule.

(4) The mobility management network element of the PS network deletes one part of the bearers and reserves the other part of bearers according to different bearer types, and indicates the SGW to suspend the reserved bearers and delete the unreserved bearers. The manner (4) may be implemented in one of the following four methods.

Method 1: The mobility management network element of the PS network sends an Update Bearer Request message to the SGW. The Update Bearer Request message contains IDs of bearers to be suspended and IDs of bearers to be deleted as well as states of the bearers. The states of the bearers to be suspended are set to "suspend", and the states of the bearers to be deleted are set to "delete." After receiving the Update Bearer Request message, the SGW suspends the bearers corresponding to the IDs of the bearers in the "suspend" state and delete the bearers corresponding to the IDs of the bearers in the "delete" state.

Method 2: The mobility management network element of the PS network sends an Update Bearer Request message to the SGW. The Update Bearer Request message contains a suspend list of the IDs of the bearers to be suspended and a delete list of the IDs of the bearers to be deleted. After receiving the Update Bearer Request message, the SGW suspends the bearers corresponding to the suspend list, and deletes the bearers corresponding to the delete list.

Method 3: The mobility management network element of the PS network sends a Suspend Bearer Request message to the SGW. The Suspend Bearer Request message contains a suspend list of the IDs of the bears to be suspended and a delete list of the IDs of the bearers to be deleted. After receiving the Suspend Bearer Request message, the SGW sets states of the bearers corresponding to the suspend list to "suspend", and deletes the bearers corresponding to the delete list.

Method 4: The mobility management network element of the PS network sends a Suspend Bearer Request message to the SGW. The Suspend Bearer Request message contains an ID of the UE and a delete list of the IDs of the bearers to be deleted. After receiving the Suspend Bearer Request message, the SGW deletes the bearers corresponding to the delete list, and suspends the other part of bearers.

Through the above embodiment, upon receiving the Handoff Direction message sent by the CDMA2000 1x access network, i.e., when the UE has finished the CDMA2000 1x network access establishment through the PS network and is ready to be handed over to the CDMA2000 1x access network, the UE actively initiates a release procedure, and sends an RRC Release Request message to the access network of the PS network to indicate the network side that the resources of the UE in the PS network can be processed; and the access network of the PS network sends the Release Request message to the mobility management network element of the PS network after receiving the RRC Release Request message sent by the UE, so that the mobility management network element of the PS network processes the resources of the UE in the PS network.

Figure 8:
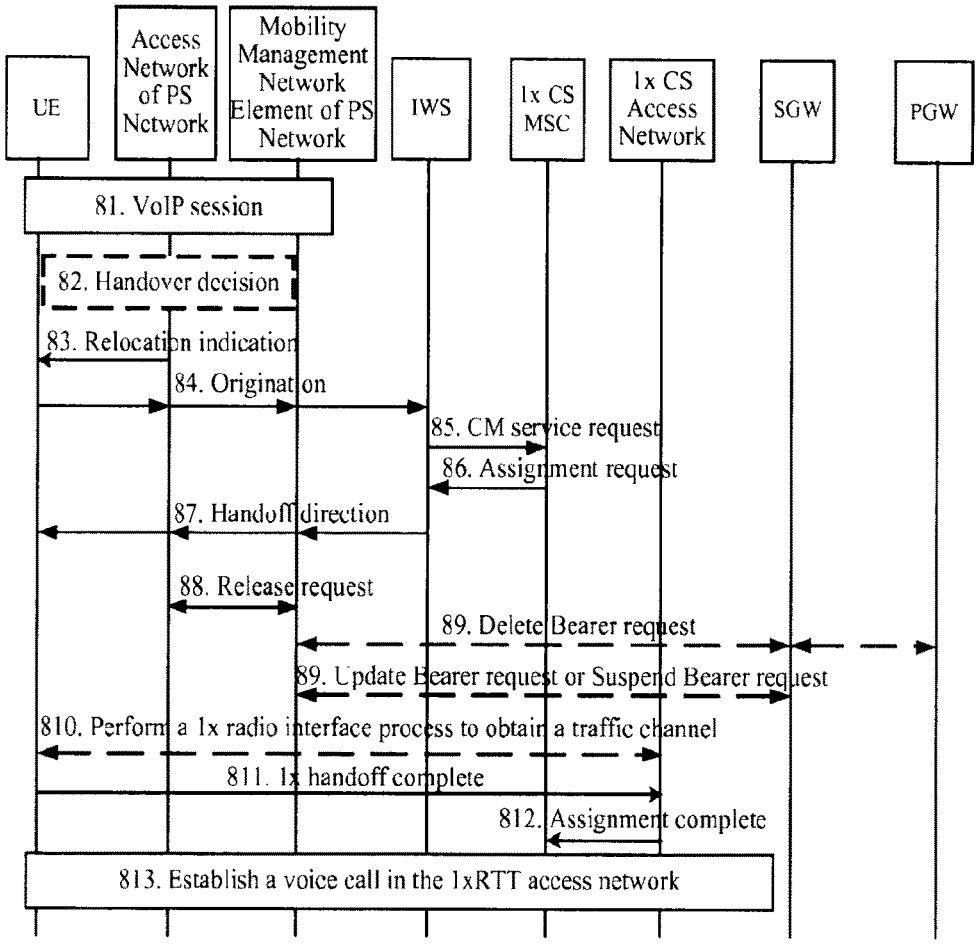
FIG. 8 is a signaling flow chart of a method for processing resource when a UE is handed over from a PS network to a CDMA2000 1x network according to another embodiment of the present invention.

FIG. 8 is a signaling flow chart of a method for processing resource when a UE is handed over from a PS network to a CDMA2000 1x network according to another embodiment of the present invention. Referring to FIG. 8, the method is as follows:

Steps 81-87 are corresponding to Steps 71-77 in the previous embodiment respectively.

In Step 88, the access network of the PS network sends a release message to the mobility management network element of the PS network after receiving the Downlink CDMA2000 Tunnel message (the Handoff Direction message is encapsulated in the message) sent by the mobility management network element of the PS network, that is, after receiving the Handoff Direction message sent by the mobility management network element of the PS network. For the E-UTRAN network, the release message is an S1 UE Context Release Request message, and for the UTRAN/GERAN network, the release message is an Iu Release Request message. The access network of the PS network carries indication information in the Release Request message, and the indication information is adapted to indicate the mobility management network element of the PS network that the Release Request is caused by handing over the UE. For example, the access network of the PS network carries a "Cause" IE in the Release Request message, and a value of the IE is set to "Handover Triggered"; or the access network of the PS network carries a "Handover Triggered Indicator" IE in the Release Request message.

Steps 89-813 are corresponding to Steps 710-714 in the previous embodiment respectively.

In this embodiment, the access network of the PS network determines that the UE is handed over according to the received Handoff Direction message sent by the mobility management network element of the PS network, and then actively initiates a Release Request message, so that the mobility management network element of the PS network processes the resources of the UE in the PS network.

Figure 9:
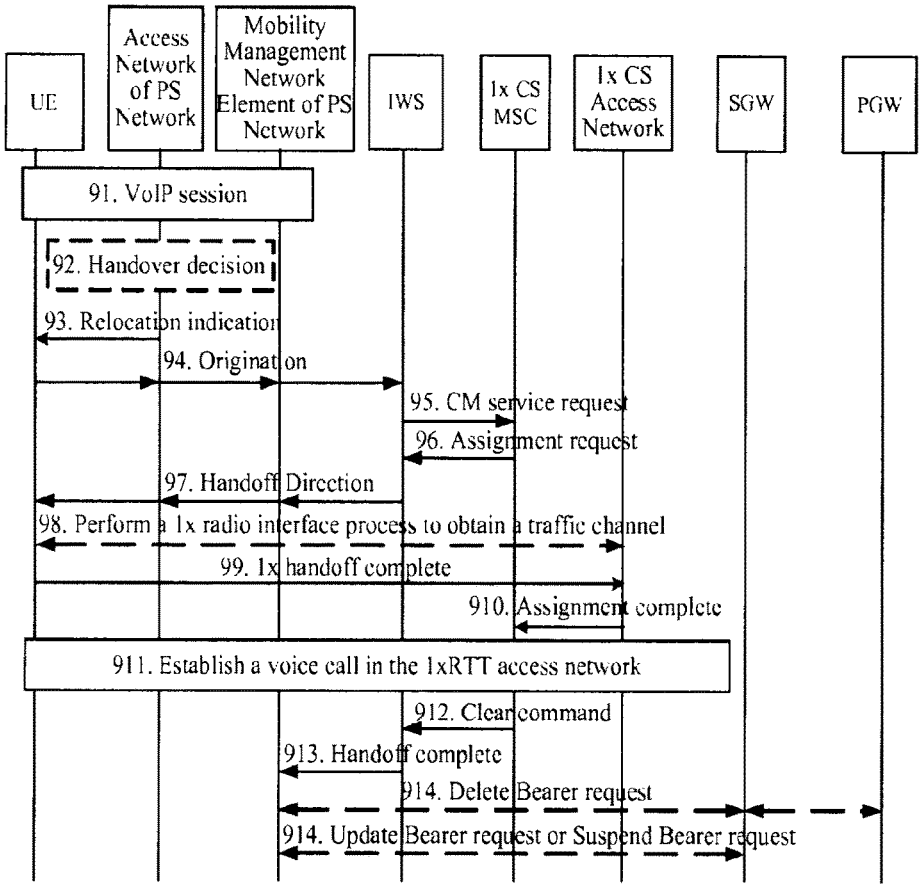
FIG. 9 is a signaling flow chart of a method for processing resource when a UE is handed over from a PS network to a CDMA2000 1x network according to still another embodiment of the present invention.

FIG. 9 is a signaling flow chart of a method for processing resource when a UE is handed over from a PS network to a CDMA2000 1x network according to still another embodiment of the present invention. Referring to FIG. 9, the method is as follows.

Steps 91-97 are corresponding to Steps 71-77 in the above embodiment respectively.

Steps 98-911 are corresponding to Steps 711-714 in the above embodiment respectively.

In Step 912, after the UE is handed over to the CDMA 2000 1x network, the 1x CS MSC receives an Assignment Complete message (shown in the figure) sent by a 1x CS access network element, or receives a 1x Handoff Complete message (not shown in the figure, and capable of replacing the Assignment Complete message) sent by the 1x CS access network element, and then sends a Clear Command message to the IWS.

In Step 913, the IWS sends a Handoff Complete message to the mobility management network element of the PS network after receiving the Clear Command message.

In Step 914, after receiving the Handoff Complete message sent by the IWS, the mobility management network element of the PS network determines that the UE is handed over, and then manages resources of the UE in the PS network. The processing method used by the mobility management network element of the PS network for managing the resources of the UE in the PS network is the same as that in Step 710, so the details will not be described herein again.

In this embodiment, when the UE is handed over from the PS network to the CS network, the mobility management network element of the PS network determines that the UE is successfully handed over to the CS network according to the received Handoff Complete message sent by the CS network, and actively initiates processing of the resources of the UE in the PS network, so that the processing of the resources of the UE in the PS network is achieved.

In the embodiment shown in FIG. 9, the IWS is an independent network element, which mainly implements a function of exchanging and forwarding 1x CS signaling, so as to encapsulate 1x CS signaling from the 1x CS MSC and send the encapsulated 1x CS signaling to the UE through the PS network; or the UE sends encapsulated 1x CS signaling to the IWS through the PS network, and the IWS forwards the encapsulated 1x CS signaling to the 1x CS MSC. In actual implementations, the function of the IWS may also be integrated with other network elements in the network to form an integrated network element. At this time, in the embodiment shown in FIG. 9, in Steps 912 and 913, the process in which the mobility management network element of the PS network receives the Handoff Complete message sent by the CS network may be as follows.

(1) If the IWS is integrated with the 1x CS access network element, the IWS/1x CS access network element sends a Handoff Complete message or an Assignment Complete message to the mobility management network element of the PS network after receiving the 1x Handoff Complete message sent by the UE. In the embodiment of the present invention, the Handoff Complete message and the Assignment Complete message are only different in name, but have the same function for indicating that the handover is completed, and may both be considered as a Handoff Complete message.

(2) If the 1x CS IWS is integrated with the mobility management network element of the PS network, the 1x CS MSC sends a Clear Command message to the 1x CS IWS or the mobility management network element of the PS network after receiving the Handoff Complete message sent by the 1x CS access network element. In this case, after the integrated network element receives the Clear Command message, the IWS in the integrated network element may convert the Clear Command message into a Handoff Complete message; or after receiving the Clear Command message, the integrated network element may consider that a Handoff Complete message is received, and perform subsequent processing.

(3) If the 1x CS IWS is integrated with the 1x CS MSC, the 1x CS IWS/1x CS MSC sends a Handoff Complete message to the mobility management network element of the PS network after receiving the Handoff Complete message sent by the 1x CS access network element.

The method for processing resources of a UE in a PS network when the UE is handed over from the PS network to a CS network has been detailed above. A communication system and a mobility management network element in a PS network, which are adapted to process resources of a UE in the PS network when the UE is handed over from the PS network to a CS network, will be described in the following. Various processing measures as well as the detailed description of the features in the above method are applicable to the communication system and the mobility management network element in a PS network described in the following.

Figure 10:
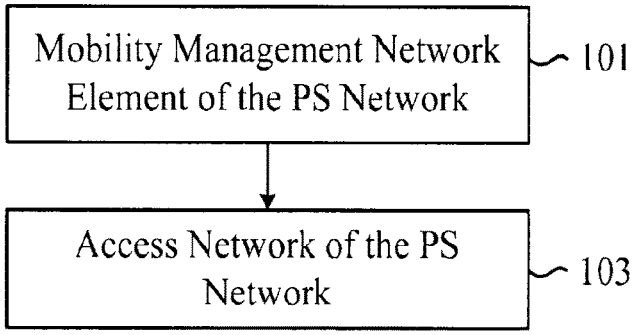
FIG. 10 is a structural view of a communication system according to an embodiment of the present invention.

FIG. 10 is a structural view of a communication system according to an embodiment of the present invention. Referring to FIG. 10, the communication system includes a mobility management network element 101 in a PS network and an access network 103 of the PS network. When a UE is handed over from the PS network to a CS network, the access network 103 of the PS network is adapted to send a Release Request message to the mobility management network element of the PS network; and the mobility management network element 101 in the PS network is adapted to receive the Release Request message sent by the access network of the PS network, and process resources of the UE in the PS network.

For a GERAN/UTRAN network, the mobility management network element of the PS network may be an SGSN; and for an E-UTRAN, the mobility management network element of the PS network may be an MME. Accordingly, the access network of the PS network may also be corresponding to access networks in various PS networks.

The specific procedure for handing over the UE from the PS network to the CS network is as described in the method embodiments of FIGS. 7 and 8, and the details will not be described herein again. Here, the access network of the PS network may send the Release Request message to the mobility management network element of the PS network after receiving a Handoff Direction message sent by the mobility management network element of the PS network, or send the Release Request message to the mobility management network element of the PS network after receiving an RRC Release Request message sent by the UE. The RRC Release Request message may be sent by the UE to the access network of the PS network after the UE receives the Handoff Direction message. The RRC Release Request message may further contain indication information indicating that the RRC Release Request is caused by handing over the UE to the CS network. For example, the UE carries a "Cause" IE in the message, and a value of the IE is set to "Handover Triggered"; or the UE carries a "Handover Triggered Indicator" IE in the message. The access network of the PS network may also be adapted to carry indication information in the Release Request message sent to the mobility management network element of the PS network, and the indication information is adapted to indicate that the Release Request is caused by handing over the UE to the CS network. For example, the access network of the PS network carries a "Cause" IE in the Release Request message, and a value of the IE is set to "Handover Triggered"; or the access network of the PS network carries a "Handover Triggered Indicator" IE in the Release Request message.

The mobility management network element of the PS network may process the resources of the UE in the PS network through one of the following manners.

(1) The mobility management network element of the PS network initiates an implicit user detachment procedure to detach the UE from the PS network. When the UE is detached from the network, the bearers are deleted from the PS network.

(2) The mobility management network element of the PS network does not detach the UE (that is, reserves an MM context of the UE). For GBR bearers, the mobility management network element of the PS network initiates a delete bearer procedure to delete the bearers; and for non-GBR bearers, the mobility management network element of the PS network reserves the bearers, but indicates the SGW to suspend the bearers. The mobility management network element of the PS network may indicate the SGW to suspend the bearers in the following methods.

(a) The mobility management network element of the PS network sends an Update Bearer Request message to the SGW. For each bearer to be suspended, the Update Bearer Request message carries an ID of the bearer and a state of the bearer. The mobility management network element of the PS network sets the state of the bearer to "suspend."

(b) The mobility management network element of the PS network sends a Suspend Bearer Request message to the SGW. For each bearer to be suspended, the Suspend Bearer Request message carries an ID of the bearer.

After receiving indication of bearer suspend, the SGW sets a state of the bearer to "suspend." After receiving downlink data packets on the bearer, the SGW does not trigger paging. The SGW may buffer the downlink data packets, or release resources used by the suspended bearers between the SGW and a downlink user plane network element (for example, the SGW releases downlink TEIDs used by the suspended bearers). For example, for an E-UTRAN network, the SGW releases resources between the SGW and an eNodeB; for a UTRAN network, the SGW releases resources between the SGW and an RNC or a 3G SGSN; and for a GERAN network, the SGW releases resources between the SGW and a 2G SGSN.

(3) The mobility management network element of the PS network does not detach the UE (that is, reserves the MM context of the UE). For VoIP bearers, the mobility management network element of the PS network initiates a delete bearer procedure to delete the bearers; and for the other part of bearers, the mobility management network element of the PS network reserves the bearers, but indicates the SGW to suspend the bearers.

(4) The mobility management network element of the PS network does not detach the UE (that is, reserves the MM context of the UE). For the bearers, the mobility management network element of the PS network reserves these bearers, but indicates the SGW to suspend the bearers. The mobility management network element of the PS network may indicate the SGW to suspend the bearers in the following methods.

(a) The mobility management network element of the PS network sends an Update Bearer Request message to the SGW. For each bearer to be suspended, the Update Bearer Request message carries an ID of the bearer and a state of the bearer. The mobility management network element of the PS network sets the state of the bearer to "suspend."

(b) The mobility management network element of the PS network sends an Update Bearer Request message to the SGW. The message carries an ID of the UE and states of bearers. The mobility management network element of the PS network sets the states of the bearers to "suspend", and the SGW sets states of all bearers of the UE to "suspend."

(c) The mobility management network element of the PS network sends a Suspend Bearer Request message to the SGW. For each bearer to be suspended, the Suspend Bearer Request message carries an ID of the bearer. After receiving the Suspend Bearer Request message, the SGW sets a state of the bearer corresponding to the ID of the bearer to "suspend."

(d) The mobility management network element of the PS network sends a Suspend Bearer Request message to the SGW. The message carries the ID of the UE. After receiving the Suspend Bearer Request message, the SGW sets states of all bearers of the UE to "suspend."

Note: The mobility management network element of the PS network may also indicate the SGW to suspend all bearers of the UE; and the mobility management network element of the PS network reserves one part of the bearers (for example, non-GBR bearers) and initiates a delete bearer procedure to delete the other part of bearers (for example, GBR bearers or VoIP bearers) according to different bearer types.

The mobility management network element of the PS network deletes one part of the bearers and reserves the other part of bearers (for example, non-GBR bearers) according to different bearer types, and indicates the SGW to suspend the reserved bearers; and the SGW suspends the reserved bearers and deletes the unreserved bearers after receiving a Suspend Bearer message (that is, the SGW deletes the unsuspended bearers, for example, the SGW deletes the GBR bearers or VoIP bearers).

The mobility management network element of the PS network deletes one part of the bearers and reserves the other part of bearers (for example, non-GBR bearers) according to different bearer types, and indicates the SGW to suspend the bearers (as described in the manner 4, the mobility management network element of the PS network sends a Suspend Bearer Request message to the SGW, and the Suspend Bearer Request message carries the ID of the UE); and the SGW suspends the reserved bearers (for example, non-GBR bearers) and deletes the unreserved bearers after receiving the Suspend Bearer message (that is, the SGW deletes the unsuspended bearers, for example, the SGW deletes the GBR bearers or VoIP bearers).

The mobility management network element of the PS network deletes one part of the bearers and reserves the other part of bearers according to different bearer types, and indicates the SGW to suspend the reserved bearers and delete the unreserved bearers. One of the following four methods may be used.

Method 1: The mobility management network element of the PS network sends an Update Bearer Request message to the SGW. The Update Bearer Request message contains IDs of bearers to be suspended and IDs of bearers to be deleted as well as states of the bearers. The states of the bearers to be suspended are set to "suspend", and the states of the bearers to be deleted are set to "delete." After receiving the Update Bearer Request message, the SGW suspends the bearers corresponding to the IDs of the bearers to be suspended, and delete the bearers corresponding to the IDs of the bearers to be deleted.

Method 2: The mobility management network element of the PS network sends an Update Bearer Request message to the SGW. The Update Bearer Request message contains a suspend list of IDs of the bearers to be suspended and a delete list of IDs of the bearers to be deleted. After receiving the Update Bearer Request message, the SGW suspends the bearers corresponding to the suspend list, and deletes the bearers corresponding to the delete list.

Method 3: The mobility management network element of the PS network sends a Suspend Bearer Request message to the SGW. The Suspend Bearer Request message contains IDs of the bearers to be suspended and a delete list of the IDs of the bearers to be deleted. After receiving the Suspend Bearer Request message, the SGW sets states of the bearers corresponding to the IDs of the bearers to be suspended to "suspend", and deletes the bearers corresponding to the delete list.

Method 4: The mobility management network element of the PS network sends a Suspend Bearer Request message to the SGW. The Suspend Bearer Request message contains an ID of the UE and a delete list of the IDs of the bearers to be deleted. After receiving the Suspend Bearer Request message, the SGW deletes the bearers corresponding to the delete list, and suspends the other part of bearers.

The communication system may further include: a CS network, adapted to interact with the mobility management network element of the PS network, provide radio resources necessary for handing over the UE, and send a Handoff Complete message to the mobility management network element of the PS network after the handover of the UE is completed. The mobility management network element of the PS network sends the Handoff Complete message to the UE through the access network of the PS network. Specific implementations are described in the following with reference to the embodiments corresponding to FIGS. 7 and 8.

Through the communication system provided by the embodiment of the present invention, the access network of the PS network sends a Release Request message to the mobility management network element of the PS network, and the mobility management network element of the PS network initiates processing of the resources of the UE in the PS network upon receiving the Release Request message sent by the access network of the PS network, so that the processing of the resources of the UE in the PS network is achieved when the UE is handed over from the PS network to a CDMA2000 1x network.

Figure 11:
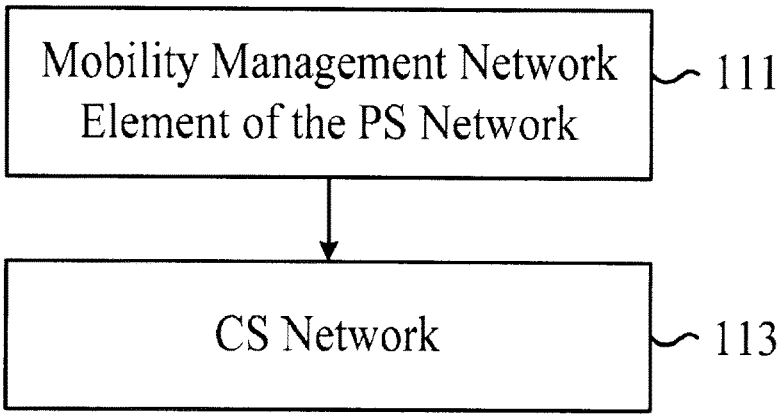
FIG. 11 is a structural view of a communication system according to another embodiment of the present invention.

FIG. 11 is a structural view of a communication system according to another embodiment of the present invention. Referring to FIG. 11, the communication system includes a mobility management network element 111 in a PS network and a CS network 113. When a UE is handed over from the PS network to the CS network, the CS network 113 is adapted to send a Handoff Complete message to the mobility management network element of the PS network; and the mobility management network element 111 in the PS network is adapted to receive the Handoff Complete message sent by the CS network, and process resources of the UE in the PS network after receiving the Handoff Complete message.

For a GERAN/UTRAN network, the mobility management network element of the PS network may be an SGSN; and for an E-UTRAN, the mobility management network element of the PS network may be an MME. The CS network may be a CDMA 2000 1x network, a GSM CS network, or the like.

The specific procedure for handing over the UE from the PS network to the CS network is as shown in the method embodiment of FIG. 9, and the details will not be described herein again. Here, the mobility management network element of the PS network processes the resources of the UE in the PS network after receiving the Handoff Complete message.

Further, the communication system may further include an IWS network element between the CS network and the PS network, and the CS network may further include an access network element and a mobility management network element. For example, in a CDMA 2000 1x network, the access network element may be a 1x CS access network element, and the mobility management network element may be a 1x CS MSC.

The IWS network element mainly implements a function of exchanging and forwarding 1x CS signaling, so as to encapsulate 1x CS signaling from the 1x CS MSC and send the encapsulated 1x CS signaling to the UE through the PS network; or the UE sends encapsulated 1x CS signaling to the IWS through the PS network, and the IWS forwards the encapsulated 1x CS signaling to the 1x CS MSC. In specific implementations, the IWS may be an independent network element, or be integrated with other network elements in the network to form an integrated network element, which may specifically include the following circumstances.

(1) If the IWS network element is integrated with the access network element of the CS network, the integrated network element is adapted to send the Handoff Complete message to the mobility management network element of the PS network after receiving the Handoff Complete message sent by the UE.

(2) If the IWS network element is integrated with the mobility management network element of the PS network, the access network element of the CS network is adapted to send the Handoff Complete message to the mobility management network element of the CS network; and the mobility management network element of the CS network is adapted to send a Clear Command message to the integrated network element after receiving the Handoff Complete message sent by the access network element of the CS network.

(3) If the IWS between the CS network and the PS network is an independent network element, the access network element of the CS network is adapted to send the Handoff Complete message to the mobility management network element of the CS network; the mobility management network element of the CS network is adapted to send a Clear Command message to the IWS after receiving the Handoff Complete message sent by the access network element of the CS network; and the IWS network element is adapted to send the Handoff Complete message to the mobility management network element of the PS network after receiving the Clear Command message sent by the mobility management network element of the CS network.

(4) If the IWS is integrated with the mobility management network element of the CS network, the integrated network element is adapted to send the Handoff Complete message to the mobility management network element of the PS network after receiving the Handoff Complete message sent by the access network element of the CS network.

The method used by the mobility management network element of the PS network for processing the resources of the UE in the PS network after receiving the Handoff Complete message is the same as that used by the mobility management network element of the PS network in the previous embodiment, and the details will not be described herein again.

Figure 12:
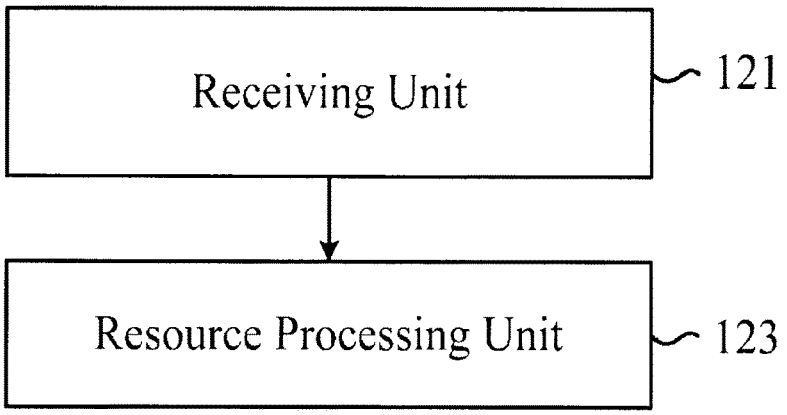
FIG. 12 is a structural view of a mobility management network element in a PS network according to an embodiment of the present invention.

FIG. 12 is a structural view of a mobility management network element in a PS network according to an embodiment of the present invention. Referring to FIG. 12, the mobility management network element includes a receiving unit 121 and a resource processing unit 123. The receiving unit 121 is adapted to receive a Release Request message sent by an access network of the PS network or a Handoff Complete message sent by a CS network when a UE is handed over from the PS network to the CS network. The resource processing unit 123 is adapted to process resources of the UE in the PS network after the receiving unit 121 receives the Release Request message sent by the access network of the PS network or the Handoff Complete message sent by the CS network.

For a GERAN/UTRAN network, the mobility management network element of the PS network may be an SGSN; and for an E-UTRAN, the mobility management network element of the PS network may be an MME.

The specific procedure for handing over the UE from the PS network to the CS network is as shown in the method embodiments of FIGS. 7, 8, and 9, and the details will not be described herein again.

Figure 13:
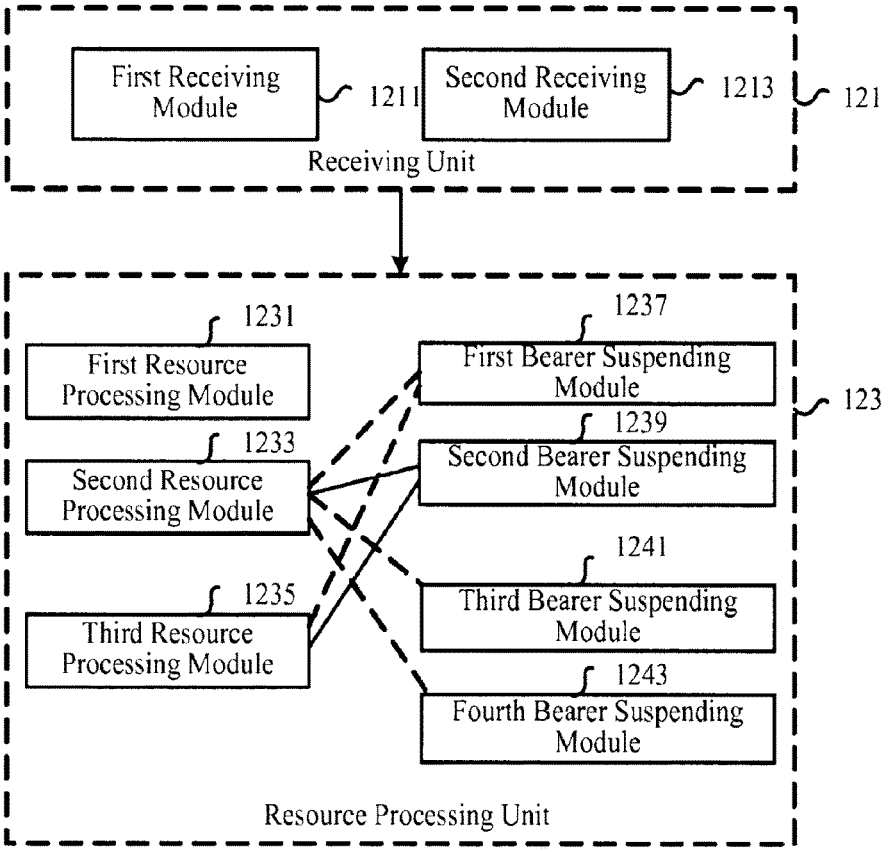
FIG. 13 is a structural view of a mobility management network element in a PS network according to another embodiment of the present invention.

FIG. 13 is a structural view of a mobility management network element in a PS network according to another embodiment of the present invention. Referring to FIG. 13, the mobility management network element includes a receiving unit 121 and a resource processing unit 123. Based on the embodiment corresponding to FIG. 12, the receiving unit 121 may further include a first receiving module 1211 and/or a second receiving module 1213.

The first receiving module 1211 is adapted to receive the Release Request message sent by the access network of the PS network when the UE is handed over from the PS network to the CS network. The Release Request message may contain indication information adapted to indicate that the Release Request is caused by handing over the UE to the CS network. For example, the Release Request message carries a "Cause" IE, and a value of the IE is set to "Handover Triggered"; or the Release Request message carries a "Handover Triggered Indicator" IE. After receiving the Release Request message sent by the access network of the PS network, if the first receiving module 1211 finds that the message carries the indication information indicating that the Release Request is caused by handing over the UE to the CS network, the first receiving module 1211 may notify the resource processing unit 123 to process the resources of the UE in the PS network.

The second receiving module 1213 is adapted to receive the Handoff Complete message sent by the CS network when the UE is handed over from the PS network to the CS network, which specifically includes the following circumstances.

(1) If an IWS network element between the CS network and the PS network is integrated with an access network element of the CS network, the second receiving module 1213 is adapted to receive a Handoff Complete message sent by the access network element of the CS network.

(2) If the IWS network element between the CS network and the PS network is integrated with the mobility management network element of the PS network, the second receiving module 1213 is adapted to receive a Clear Command message sent by a mobility management network element of the CS network.

(3) If the IWS between the CS network and the PS network is an independent network element, the second receiving module 1213 is adapted to receive a Handoff Complete message sent by the IWS network element, and the IWS network element sends the Handoff Complete message to the second receiving module 1213 after receiving a Clear Command message sent by the mobility management network element of the CS network.

(4) If the IWS network element between the CS network and the PS network is integrated with the mobility management network element of the CS network, the second receiving module 1213 is adapted to receive a Handoff Complete message sent by the mobility management network element of the CS network.

After receiving the Handoff Complete message sent by the CS network, the second receiving module 1213 may notify the resource processing unit 123 to process the resources of the UE in the PS network.

Furthermore, the resource processing unit 123 may specifically include at least one of the following modules: (1) a first resource processing module 1231, adapted to initiate an implicit user detachment procedure to detach the UE from the PS network; (2) a second resource processing module 1233, adapted to reserve all bearers of the UE in the PS network and indicate an SGW to suspend the bearers; and (3) a third resource processing module 1235, adapted to initiate a delete bearer procedure to delete bearers corresponding to one part of bearer types and reserve bearers corresponding to the other bearer types according to different bearer types, and indicate the SGW to suspend the reserved bearers. For example, for GBR bearers, the third resource processing module 1235 initiates a delete bearer procedure to delete the bearers; and for non-GBR bearers, the third resource processing module 1235 reserves the non-GBR bearers, and indicates the SGW to suspend the non-GBR bearers.

Alternatively, for VoIP bearers, the third resource processing module 1235 initiates a delete bearer procedure to delete the bearers; and for bearers other than the VoIP bearers, the third resource processing module 1235 reserves the bearers other than the VoIP bearers, and indicates the SGW to suspend the bearers other than the VoIP bearers. In this way, original voice bearers of the UE in the PS network may be released in time, and other non-voice bearers may be reserved and suspended. Thus, the UE can continuously provide services to the user after returning to the PS network.

In the embodiment of the present invention, the resource processing unit may further include at least one of the following modules, or include various combinations of the following modules and the first resource processing module, the second resource processing module, and the third resource processing module: (1) a fourth resource processing module, adapted to delete one part of the bearers and reserve bearers according to different bearer types, and indicate the SGW to suspend the reserved bearers; (2) a fifth resource processing module, adapted to indicate the SGW to suspend all bearers of the UE, and reserve one part of the bearers and initiate a delete bearer procedure to delete the other part of bearers according to different bearer types; (3) a sixth resource processing module, adapted to indicate the SGW to suspend all bearers of the UE, and delete one part of the bearers and reserve the other part of bearers according to different bearer types; and (4) a seventh resource processing module, adapted to delete one part of the bearers and reserve the other part of bearers according to different bearer types, and indicate the SGW to suspend the reserved bearers and delete the unreserved bearers.

The resource processing unit 123 may also further include at least one of the following modules: a first bearer suspending module 1237, a second bearer suspending module 1239, a third bearer suspending module 1241, and a fourth bearer suspending module 1243. The second resource processing module 1233, the third resource processing module 1235, or the fourth resource processing module may send IDs of bearers to be suspended to the first bearer suspending module 1237 or the second bearer suspending module 1239; alternatively, the second resource processing module 1233, the fifth resource processing module, or the sixth resource processing module sends an ID of the UE to the third bearer suspending module 1241 or the fourth bearer suspending module 1243 to indicate to suspend all bearers of the UE. The first bearer suspending module 1237 is adapted to receive IDs of the bearers to be suspended and send an Update Bearer Request message to the SGW. The Update Bearer Request message contains the IDs of the bearers to be suspended and states of the bearers, and the states of the bearers are set to "suspend."

The second bearer suspending module is adapted to receive IDs of the bearers to be suspended and send a Suspend Bearer Request message to the SGW. The Suspend Bearer Request message contains the IDs of the bearers to be suspended, and the Suspend Bearer Request message is adapted to indicate the SGW to set states of the bearers corresponding to the IDs of the bearers to "suspend."

The third bearer suspending module is adapted to receive the ID of the UE to be suspended and send an Update Bearer Request message to the SGW. The Update Bearer Request message contains the ID of the UE and states of bearers, the states of the bearers are set to "suspend", and the Update Bearer Request message is adapted to indicate the SGW to set states of all bearers of the UE to "suspend."

The fourth bearer suspending module is adapted to receive the ID of the UE to be suspended and send a Suspend Bearer Request message to the SGW. The Suspend Bearer Request message contains the ID of the UE, and the Suspend Bearer Request message is adapted to indicate the SGW to set states of all bearers of the UE to "suspend."

The seventh resource processing module may further include at least one of the following subunits: (1) a first processing subunit, adapted to send an Update Bearer Request message to the SGW, in which the Update Bearer Request message contains IDs of bearers to be suspended and IDs of bearers to be deleted as well as states of the bearers, the states of the bearers to be suspended are set to "suspend", and the states of the bearers to be deleted are set to "delete"; (2) a second processing subunit, adapted to send an Update Bearer Request message to the SGW, in which the Update Bearer Request message contains a suspend list of IDs of the bearers to be suspended and a delete list of IDs of the bearers to be deleted; (3) a third processing subunit, adapted to send a Suspend Bearer Request message to the SGW, in which the Suspend Bearer Request message contains a suspend list of IDs of the bearers to be suspended and a delete list of IDs of the bearers to be deleted; and (4) a fourth processing subunit, adapted to send a Suspend Bearer Request message to the SGW, in which the Suspend Bearer Request message carries the ID of the UE and a delete list of IDs the bearers to be deleted.

After the SGW suspends the bearers, the SGW subsequently receives downlink data packets on the suspended bearers but does not trigger paging. The SGW may buffer these downlink data packets, and may also release resources used by the suspended bearers between the SGW and a downlink user plane network element, for example, release downlink TEIDs used by the suspended bearers. For example, for an E-UTRAN network, the SGW releases resources between the SGW and an eNodeB; for a UTRAN network, the SGW releases resources between the SGW and an RNC or a 3G SGSN; and for a GERAN network, the SGW releases resources between the SGW and a 2G SGSN.

Through the mobility management network element in a PS network provided by the embodiment of the present invention, the receiving unit 121 receives a Release Request message sent by the access network of the PS network or a Handoff Complete message sent by the CS network when the UE is handed over from the PS network to the CS network, and the resource processing unit 123 processes the resources of the UE in the PS network after the receiving unit 121 receives the Release Request message sent by the access network of the PS network or the Handoff Complete message sent by the CS network, so that the processing of the resources of the UE in the PS network is achieved when the UE is handed over from the PS network to the CS network.

Through the above description of the embodiments, it is apparent to those skilled in the art that the present invention may be implemented through software on a necessary universal hardware platform, and definitely may also be implemented through hardware; however, in many cases, the former is more preferable. Therefore, the technical solutions of the present invention or the part that contributes to the prior art can be substantially provided in the form of a software product. The computer software product is stored in a readable storage medium such as a floppy disk, a hard disk, or an optical disk of a computer, and contains instructions to instruct a computer equipment (for example, a personal computer, a server, or a network equipment) to perform the methods described in the embodiments of the present invention.

The above description is merely preferred embodiments of the technical solutions of the present invention, but is not intended to limit the protective scope of the present invention. Any modification, equivalent replacement, and improvement without departing from the principles of the present invention shall fall within the scope of the present invention.

What is claimed is:

[1. A method for processing resources comprising:

receiving, by a mobility management network element of a packet switched (PS) network, one of (a) a Release Request message sent by an access network of the PS network and (b) a Handoff Complete message sent by a circuit switched (CS) network when a user equipment (UE) is handed over from the PS network to the CS network, and processing resources of the UE in the PS network;

wherein the receiving, by the mobility management network element of the PS network, the Handoff Complete message sent by the CS network specifically comprises at least one of:

if an interworking solution function (IWS) network element between the CS network and the PS network is integrated with an access network element of the CS network, sending, by the access network element of the CS network, the Handoff Complete message to the mobility management network element of the PS network after receiving the Handoff Complete message sent by the UE;

if the IWS network element between the CS network and the PS network is integrated with the mobility management network element of the PS network, sending, by a mobility management network element of the CS network, a Clear Command message to the mobility management network element of the PS network after receiving the Handoff Complete message sent by an access network element of the CS network;

if the IWS between the CS network and the PS network is an independent network element, sending, by a mobility management network element of the CS network, a Clear Command message to the IWS network element after receiving the Handoff Complete message sent by an access network element of the CS network; and sending, by the IWS network element, the Handoff Complete message to the mobility management network element of the PS network; and if the IWS network element between the CS network and the PS network is integrated with a mobility management network element of the CS network, sending, by the mobility management network element of the CS network, the Handoff Complete message to the mobility management network element of the PS network after receiving the Handoff Complete message sent by an access network element of the CS network.]

[2. The method according to claim 1, wherein before the receiving, by the mobility management network element of the PS network, the Release Request message sent by the access network of the PS network, the method further comprises:

sending, by the access network of the PS network, the Release Request message to the mobility management network element of the PS network after receiving a Handoff Direction message sent by the mobility management network element of the PS network.]

[3. The method according to claim 1, wherein before the receiving, by the mobility management network element of the PS network, the Release Request message sent by the access network of the PS network, the method further comprises:

sending, by the access network of the PS network, the Release Request message to the mobility management network element of the PS network after receiving a Radio Resource Control (RRC) Release Request message sent by the UE, wherein the RRC Release Request message is sent by the UE to the access network of the PS network after the UE receives a Handoff Direction message.]

[4. The method according to claim 3, wherein the RRC Release Request message sent by the UE and received by the access network of the PS network further comprises indication information indicating that the RRC Release Request is caused by handing over the UE to the CS network.]

[5. The method according to claim 1, wherein the Release Request message received by the mobility management network element of the PS network further comprises indication information indicating that the Release Request is caused by handing over the UE to the CS network, and the mobility management network element of the PS network processes the resources of the UE in the PS network according to the indication information.]

[6. The method according to claim 1, wherein the processing, by the mobility management network element of the PS network, the resources of the UE in the PS network comprises at least one of:

initiating, by the mobility management network element of the PS network, an implicit user detachment procedure to detach the UE from the PS network;

reserving, by the mobility management network element of the PS network, all bearers of the UE in the PS network, and indicating a serving gateway (SGW) to suspend the bearers; and deleting, by the mobility management network element of the PS network, one part of bearers and suspending the other part of bearers according to different bearer types.]

[7. The method according to claim 6, wherein the deleting, by the mobility management network element of the PS network, one part of the bearers and suspending the other part of bearers according to the different bearer types comprises at least one of:

initiating, by the mobility management network element of the PS network, a delete bearer procedure to delete one part of the bearers and reserving the other part of bearers according to the different bearer types, and indicating the SGW to suspend the reserved bearers;

indicating, by the mobility management network element of the PS network, the SGW to suspend all bearers of the UE; and reserving, by the mobility management network element of the PS network, one part of the bearers and initiating a delete bearer procedure to delete the other part of bearers according to the different bearer types;

deleting, by the mobility management network element of the PS network, one part of the bearers and reserving the other part of bearers according to the different bearer types, and indicating the SGW to suspend the reserved bearers; and suspending, by the SOW, the reserved bearers, and deleting the unreserved bearers; deleting, by the mobility management network element of the PS network, one part of the bearers and reserving the other part of bearers according to the different bearer types, and indicating the SGW to suspend all bearers of the UE; and deleting, by the SGW, one part of the bearers and reserving the other part of bearers according to the different bearer types after receiving a Suspend Bearer message; and deleting, by the mobility management network element of the PS network, one part of the bearers and reserving the other part of bearers according to the different bearer types, and indicating the SGW to suspend the reserved bearers and delete the unreserved bearers.]

[8. The method according to claim 7, wherein the indicating, by the mobility management network element of the PS network, the SGW to suspend the reserved bearers and delete the unreserved bearers comprises at least one of:

sending, by the mobility management network element of the PS network, an Update Bearer Request message to the SGW, wherein the Update Bearer Request message contains IDs of bearers to be suspended and IDs of bearers to be deleted as well as states of the bearers, the states of the bearers to be suspended are set to suspend, and the states of the bearers to be deleted are set to delete;

sending, by the mobility management network element of the PS network, an Update Bearer Request message to the SGW, wherein the Update Bearer Request message contains a suspend list of IDs of bearers to be suspended and a delete list of IDs of bearers to be deleted;

sending, by the mobility management network element of the PS network, a Suspend Bearer Request message to the SGW, wherein the Suspend Bearer Request message contains a suspend list of IDs of bearers to be suspended and a delete list of IDs of bearers to be deleted; and sending, by the mobility management network element of the PS network, a Suspend Bearer Request message to the SGW, wherein the Suspend Bearer Request message carries an ID of the UE and a delete list of IDs of bearers to be deleted.]

[9. The method according to claim 6, wherein the indicating, by the mobility management network element of the PS network, the SGW to suspend the bearers comprises at least one of:

sending, by the mobility management network element of the PS network, an Update Bearer Request message to the SGW, wherein the Update Bearer Request message comprises IDs of bearers to be suspended and states of the bearers, and the states of the bearers are set to suspend;

sending, by the mobility management network element of the PS network, a Suspend Bearer Request message to the SGW, wherein the Suspend Bearer Request message comprises IDs of bearers to be suspended; and setting, by the SGW, states of the bearers corresponding to the IDs of the bearers to suspend after receiving the Suspend Bearer Request message;

sending, by the mobility management network element of the PS network, an Update Bearer Request message to the SOW, wherein the Update Bearer Request message contains an ID of the UE and states of bearers, and the states of the bearers are set to suspend; and setting, by the SGW, the states of all bearers of the UE to suspend; and sending, by the mobility management network element of the PS network, a Suspend Bearer Request message to the SGW, wherein the Suspend Bearer Request message contains an ID of the UE; and setting, by the SGW, states of all bearers of the UE to suspend after receiving the Suspend Bearer Request message.]

[10. A mobility management network element in a packet switched (PS) network, comprising:

a receiving unit for receiving a Release Request message sent by an access network of the PS network or a Handoff Complete message sent by a circuit switched (CS) network when a user equipment (UE) is handed over from the PS network to the CS network, and a resource processing unit for processing resources of the UE in the PS network after the receiving unit receives the Release Request message sent by the access network of the PS network or the Handoff Complete message sent by the CS network wherein the receiving unit comprises at least one of the following modules:

a first receiving module for receiving the Release Request message sent by the access network of the PS network when the UE is handed over from the PS network to the CS network, wherein the Release Request message comprises indication information indicating that the Release Request is caused by handing over the UE to the CS network; and a second receiving module for receiving the Handoff Complete message sent by the CS network when the UE is handed over from the PS network to the CS network; wherein:

if an interworking solution function (IWS) network element between the CS network and the PS network is integrated with an access network element of the CS network, the second receiving module is for receiving the Handoff Complete message sent by the access network element of the CS network; or if the IWS network element between the CS network and the PS network is integrated with the mobility management network element of the PS network, the second receiving module is for receiving a Clear Command message sent by a mobility management network element of the CS network; or if the IWS network element between the CS network and the PS network is an independent network element, the second receiving module is for receiving the Handoff Complete message sent by the IWS network element, wherein the IWS network element sends the Handoff Complete message to the second receiving module after receiving a Clear Command message sent by a mobility management network element of the CS network; or if the IWS network element between the CS network and the PS network is integrated with a mobility management network element of the CS network, the second receiving module is for receiving the Handoff Complete message sent by the mobility management network element of the CS network.]

[11. A mobility management network element in a packet switched (PS) network, comprising:

a receiving unit for receiving a Release Request message sent by an access network of the PS network or a Handoff Complete message sent by a circuit switched (CS) network when a user equipment (UE) is handed over from the PS network to the CS network, and a resource processing unit for processing resources of the UE in the PS network after the receiving unit receives the Release Request message sent by the access network of the PS network or the Handoff Complete message sent by the CS network;

wherein the resource processing unit specifically comprises at least one of the following modules:

a first resource processing module for initiating an implicit user detachment procedure to detach the UE from the PS network;

a second resource processing module for reserving all bearers of the UE in the PS network and indicate a serving gateway (SGW) to suspend the bearers;

a third resource processing module for initiating delete bearer procedure(s) to delete bearers corresponding to one part of bearer types and reserve bearers corresponding to the other bearer types according to the different bearer types, and indicate the SGW to suspend the reserved bearers;

a fourth resource processing module for deleting one part of the bearers and reserve the other part of bearers according to the different bearer types, and indicate the SGW to suspend the reserved bearers;

a fifth resource processing module for indicating the SGW to suspend all bearers of the UE, reserve one part of the bearers, and initiate a delete bearer procedure to delete the other part of bearers according to the different bearer types;

a sixth resource processing module for indicating the SGW to suspend all bearers of the UE, delete one part of the bearers, and reserve the other part of bearers according to the different bearer types; and a seventh resource processing module for deleting one part of the bearers and reserve the other part of bearers according to the different bearer types, and indicate the SGW to suspend the reserved bearers and delete the unreserved bearers.]

[12. The mobility management network element according to claim 11, wherein the resource processing unit further comprises at least one of the following modules: a first bearer suspending module, a second bearer suspending module, a third bearer suspending module, and a fourth bearer suspending module; the second resource processing module, the third resource processing module or the fourth resource processing module sends IDs of bearers to be suspended to the first bearer suspending module or the second bearer suspending module, or the second resource processing module, the fifth resource processing module or the sixth resource processing module sends an ID of the UE to the third bearer suspending module or the fourth bearer suspending module; wherein:

the first bearer suspending module is for receiving IDs of bearers to be suspended and send an Update Bearer Request message to the SGW, wherein the Update Bearer Request message contains the IDs of the bearers to be suspended and states of the bearers, and the states of the bearers are set to suspend;

the second bearer suspending module is for receiving the IDs of the bearers to be suspended and send a Suspend Bearer Request message to the SGW, wherein the Suspend Bearer Request message contains the IDs of the bearers to be suspended, and the Suspend Bearer Request message is for indicating the SGW to set the states of the bearers corresponding to the IDs of the bearers to suspend;

the third bearer suspending module is for receiving the ID of the UE to be suspended and send an Update Bearer Request message to the SGW, wherein the Update Bearer Request message contains the ID of the UE and states of bearers, the states of the bearers are set to suspend, and the Update Bearer Request message is for indicating the SGW to set states of all bearers of the UE to suspend; and the fourth bearer suspending module is for receiving the ID of the UE to be suspended and send a Suspend Bearer Request message to the SGW, wherein the Suspend Bearer Request message contains the ID of the UE, and the Suspend Bearer Request message is for indicating the SGW to set the states of all bearers of the UE to suspend.]

[13. The mobility management network element according to claim 11, wherein the seventh resource processing module comprises at least one of the following subunits:

a first processing subunit for sending an Update Bearer Request message to the SGW, wherein the Update Bearer Request message contains IDs of bearers to be suspended and IDs of bearers to be deleted as well as states of the bearers, the states of the bearers to be suspended are set to suspend, and the states of the bearers to be deleted are set to delete;

a second processing subunit for sending an Update Bearer Request message to the SGW, wherein the Update Bearer Request message contains a suspend list of IDs of bearers to be suspended and a delete list of IDs of bearers to be suspended;

a third processing subunit for sending a Suspend Bearer Request message to the SGW, wherein the Suspend Bearer Request message contains a suspend list of IDs of bearers to be suspended and a delete list of IDs of bearers to be deleted; and a fourth processing subunit for sending a Suspend Bearer Request message to the SGW, wherein the Suspend Bearer Request message carries the ID of the UE and a delete list of IDs of bearers to be deleted.]

*14. A method for processing resources during a handover of a user equipment (UE) from a packet switched (PS) network to a circuit switched (CS) network, the method comprising:*

*sending, by a mobility management network element in the PS network, a delete bearer request message to a serving gateway (SGW) to delete Guaranteed Bit Rate (GBR) bearers of the UE; and*

*sending, by the mobility management network element, a message to the serving gateway to suspend a non-Guaranteed Bit Rate (non-GBR) bearer of the UE.*

*15. The method according to claim 14, wherein the message is a suspend bearer request message.*

*16. The method according to claim 14, further comprising receiving, by the mobility management network element, a release request message from an access network of the PS network or a handoff complete message from the CS network.*

*17. A mobility management network element comprising:*

*a memory storage comprising instructions; and*

*one or more processors in communication with the memory storage, wherein during a handover of a user equipment (UE) from a packet switched (PS) network to a circuit switched (CS) network, the one or more processors execute the instructions to:*

*send a delete bearer request message to a serving gateway to delete Guaranteed Bit Rate (GBR) bearers of the UE; and*

*send a message to the serving gateway (SGW) to suspend non-Guaranteed Bit Rate (non-GBR) bearers of the UE.*

*18. The mobility management network element according to claim 17, wherein the message is a suspend bearer request message.*

*19. The mobility management network element according to claim 17, the memory storage includes instructions to receive a release request message from an access network of the PS network or a handoff complete message from the CS network.*

* * * * *